United States Patent
Schroeder (10) Patent No.: US 8,181,102 B2
(45) Date of Patent: *May 15, 2012

(54) CREATING BOOKMARK SYMLINKS

(75) Inventor: Paul B. Schroeder, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 861 days.

This patent is subject to a terminal disclaimer.

(21) Appl. No.: 12/170,872

(22) Filed: Jul. 10, 2008

(65) Prior Publication Data

US 2008/0263434 A1 Oct. 23, 2008

Related U.S. Application Data

(63) Continuation of application No. 09/826,664, filed on Apr. 5, 2001, now Pat. No. 7,406,656.

(51) Int. Cl.
*G06N 3/00* (2006.01)

(52) U.S. Cl. ...................................................... 715/206

(58) Field of Classification Search .................. 715/206, 715/234, 243, 254

See application file for complete search history.

(56) References Cited

U.S. PATENT DOCUMENTS

| | | | |
|---|---|---|---|
| 5,642,503 A | 6/1997 | Reiter |
| 5,809,250 A | 9/1998 | Kisor |
| 5,917,491 A | 6/1999 | Bauersfeld |
| 5,935,210 A | 8/1999 | Stark |
| 6,037,934 A | 3/2000 | Himmel et al. |
| 6,096,096 A | 8/2000 | Murphy et al. |
| 6,243,071 B1 | 6/2001 | Shwarts et al. |
| 6,321,228 B1 | 11/2001 | Crandall et al. |
| 6,324,566 B1 | 11/2001 | Himmel et al. |
| 6,330,007 B1 | 12/2001 | Isreal et al. |
| 6,427,175 B1 | 7/2002 | Khan et al. |
| 6,460,038 B1 | 10/2002 | Khan et al. |

*Primary Examiner* — Kyle Stork (74) *Attorney, Agent, or Firm* — Yee & Associates, P.C.; David A. Mims, Jr.

(57) ABSTRACT

A bookmark editor in an Internet web browser application allows a user to create symbolic links between bookmarks and bookmark folders. The bookmark editor may also detect when a bookmark already exists for a document and prompt the user to create a link rather than a new bookmark for the same document. The user may then keep a folder, subfolder, or bookmark and link to it via a symbolic link. When a bookmark is added to a folder or subfolder, the user does not need to duplicate that bookmark for a linked folder or subfolder.

20 Claims, 6 Drawing Sheets

CREATING BOOKMARK SYMLINKS

This application is a continuation of application Ser. No. 09/826,664, filed Apr. 5, 2001, now U.S. Pat. No. 7,406,656 issued Jul. 29, 2008.

BACKGROUND OF THE INVENTION

1. Technical Field

The present invention relates to network data processing and, in particular, to bookmark editing in a web browser. Still more particularly, the present invention provides a method, apparatus, and program for creating bookmark symbolic links (symlinks) in a web browser.

2. Description of Related Art

The worldwide network of computers commonly known as the "Internet" has seen explosive growth in the last several years. Mainly, this growth has been fueled by the introduction and widespread use of so-called "web browsers," which enable simple graphical user interface-based access to network servers, which support documents formatted as so-called "web pages." A browser is a program that is executed on a graphical user interface (GUI). The browser allows a user to seamlessly load documents from the Internet and display them by means of the GUI. The browser gives some means of viewing the contents of web pages (or nodes) and of navigating from one web page to another.

Bookmarks are stored locations for quick retrieval at a later date. Web browsers provide bookmarks that contain the addresses of favorite sites. Most electronic references, large text databases and help systems provide bookmarks that mark a location users want to revisit in the future. Bookmarks may also be referred to as "favorites" or "favorite places."

Often, however, users may wish to maintain duplicate bookmarks or folders for consistency and improved organization. For example, a user may have a bookmark folder for IBM and a subfolder for Linux which stores bookmarks relating to Linux at IBM. The user may also have a folder for Linux. Thus, the user may also wish to keep a subfolder for IBM under the Linux folder. However, this requires an inconvenient duplication process. Furthermore, every time a bookmark is added to one of the subfolders, the bookmark must also be added to the duplicate subfolder.

Therefore, it would be advantageous to provide a mechanism to create a symbolic link (symlink) for a bookmark or bookmark folder in a bookmark editor.

SUMMARY OF THE INVENTION

The present invention provides a bookmark editor in an Internet web browser application that allows a user to create symbolic links between bookmarks and bookmark folders. The present invention may also detect when a bookmark already exists for a document and prompt the user to create a link rather than a new bookmark for the same document. The user may then keep a folder, subfolder, or bookmark and link to it via a symbolic link. When a bookmark is added to a folder or subfolder, the user does not need to duplicate that bookmark for a linked folder or subfolder.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
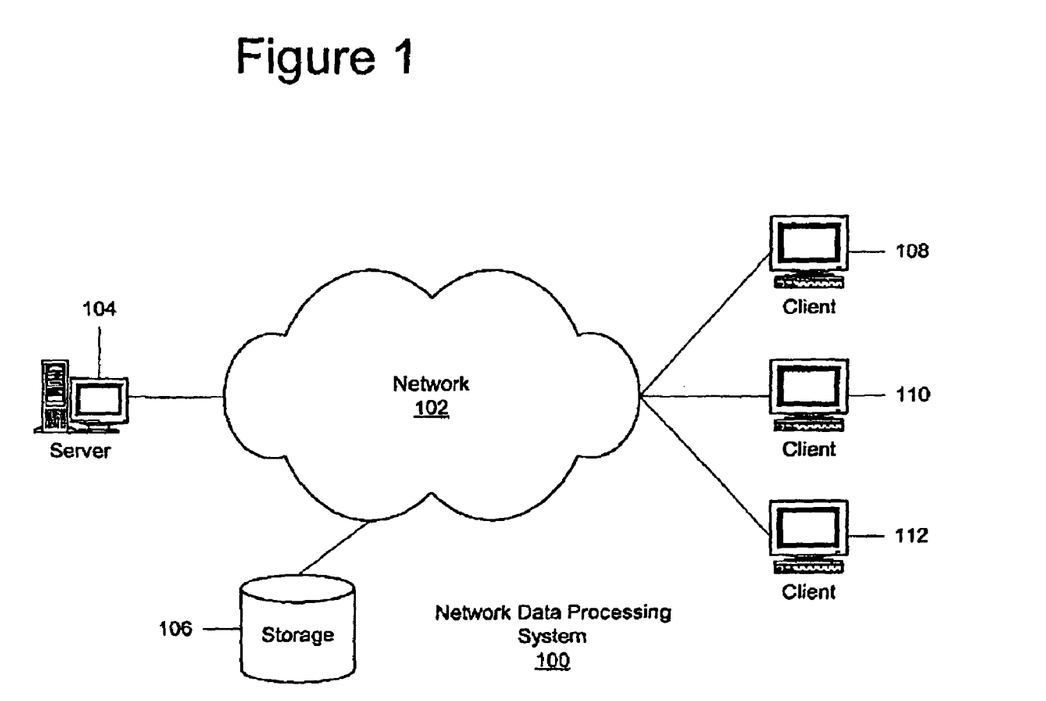
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
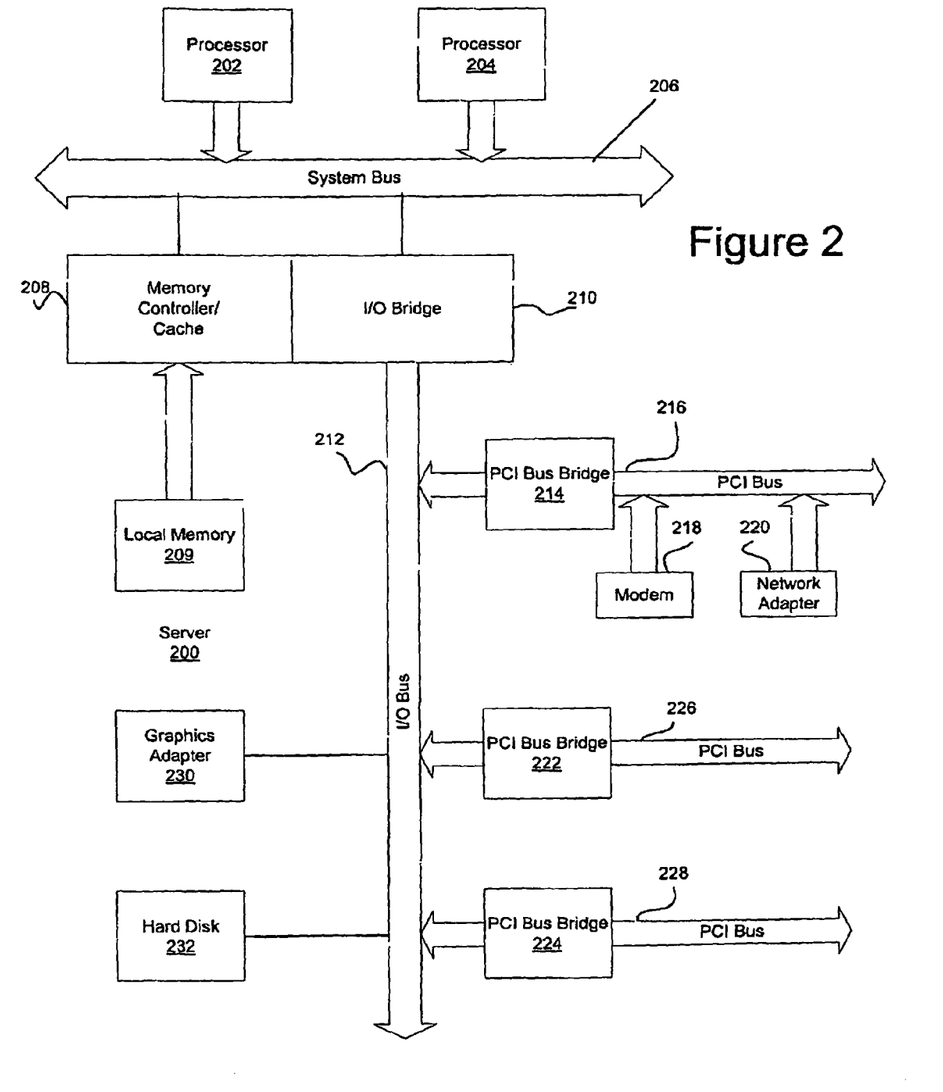
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
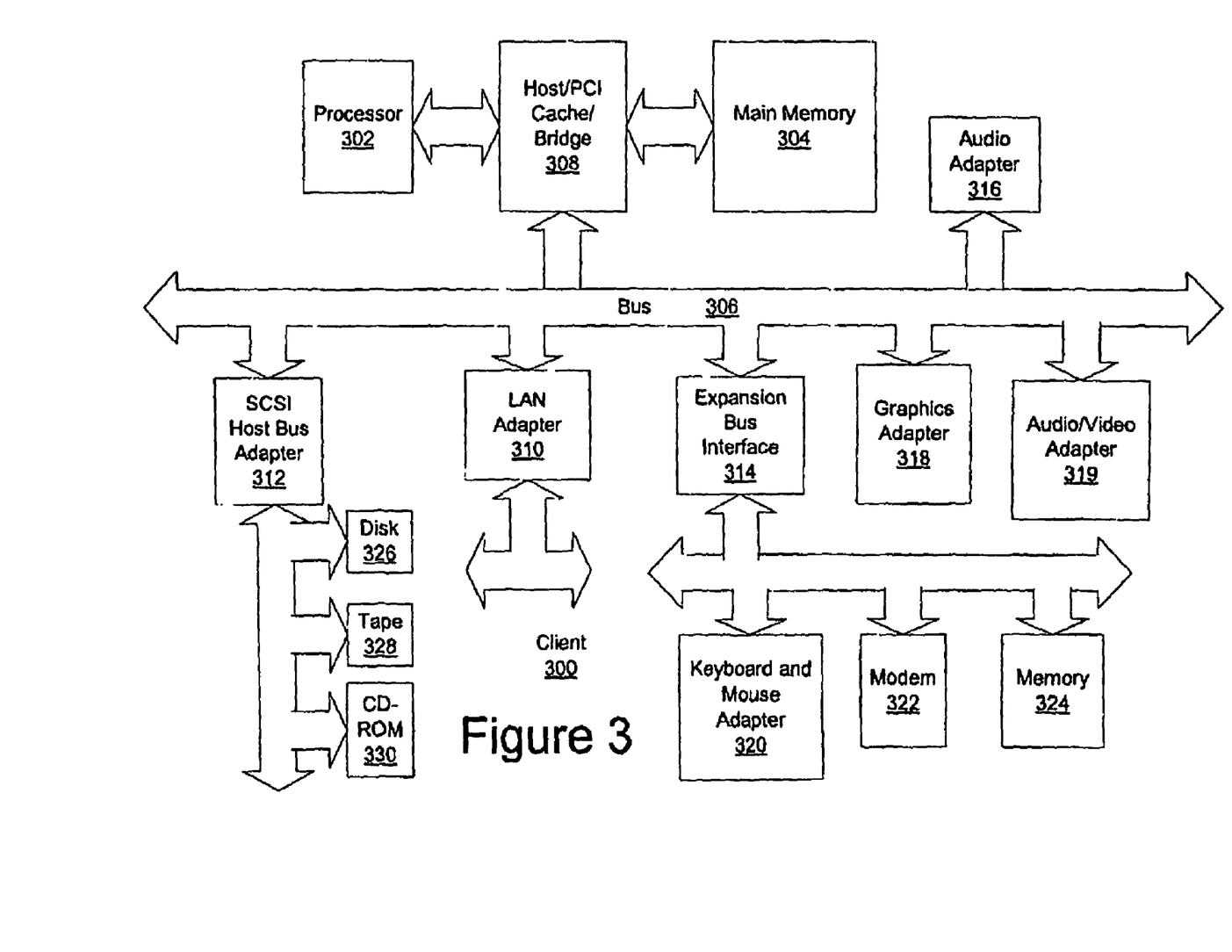
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
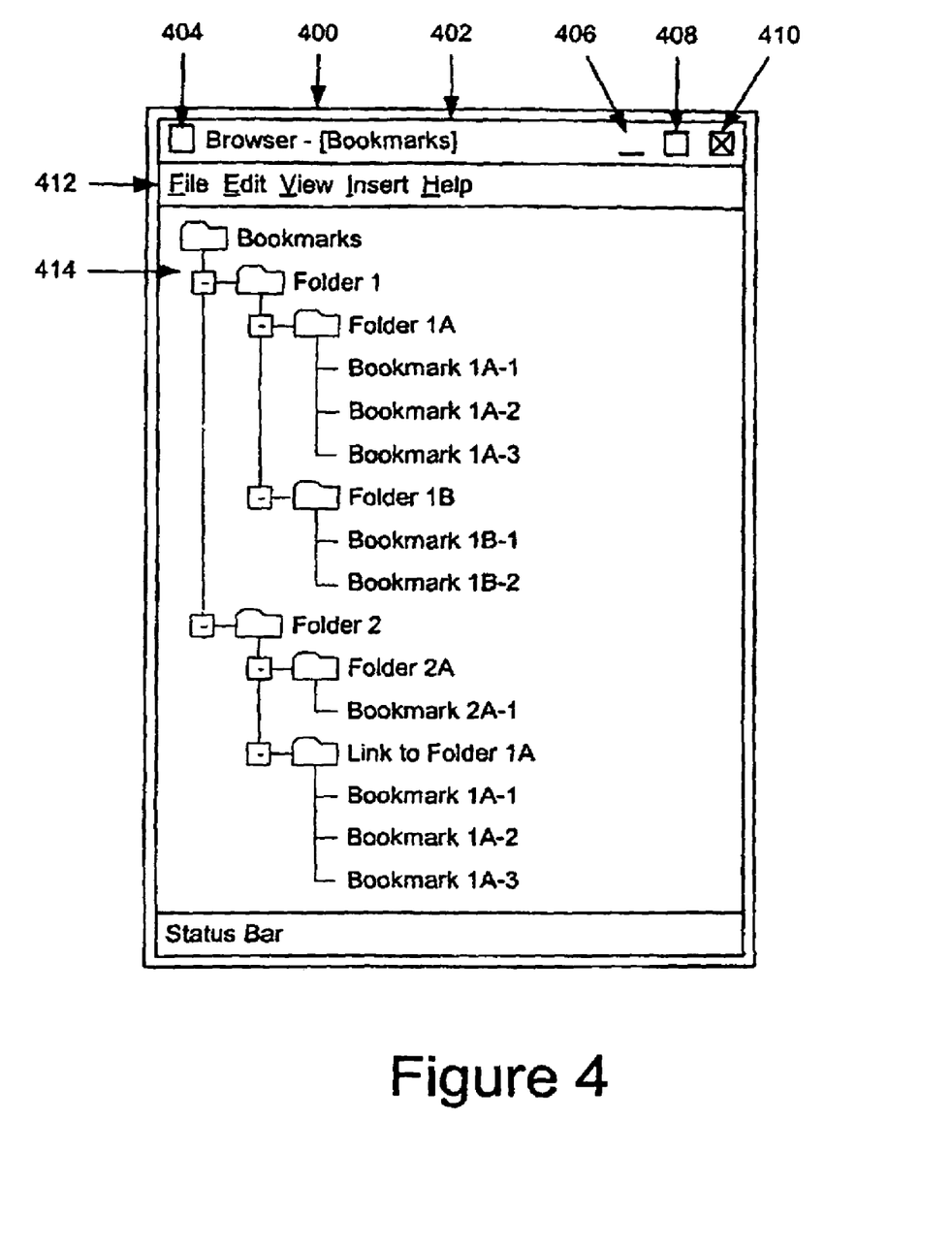
FIG. 4 is an example of a screen of display of a bookmark editor window in accordance with a preferred embodiment of the present invention.

An example of a screen of display of a bookmark editor window is shown in FIG. 4 in accordance with a preferred embodiment of the present invention. The screen comprises window 400, including a title bar 402, which may display the name of the application program. Title bar 402 also includes a control box 404, which produces a drop-down menu (not shown) when selected with the mouse, and "minimize" 406, "maximize" or "restore" 408, and "close" 410 buttons. The "minimize" and "maximize" or "restore" buttons 406 and 408 determine the manner in which the program window is displayed. In this example, the "close" button 410 produces an "exit" command when selected. The drop-down menu produced by selecting control box 404 includes commands corresponding to "minimize," "maximize" or "restore," and "close" buttons, as well as "move" and "resize" commands.

Bookmark editor window 400 also includes a menu bar 412. Menus to be selected from menu bar 412 may include "File", "Edit", "view", "Insert", and "Help." However, menu bar 412 may include fewer or more menus, as understood by a person of ordinary skill in the art.

The bookmark editor window display area includes a bookmark display area 414 in which existing bookmarks and folders are displayed in a tree structure. Under the main "Bookmarks" folder, "Folder 1" and "Folder 2" subfolders exist. Each subfolder may include further subfolders. For example, Folder 1 includes "Folder 1A" and "Folder 1B" subfolders. Each folder or subfolder may hold one or more bookmarks. In the example shown in FIG. 4, Folder 1A includes "Bookmark 1A-1," "Bookmark 1A-2," and "Bookmark 1A-3."

A user may desire to maintain duplicate bookmarks to maintain consistency and logical order in the bookmark editor. For example, Folder 1 may hold bookmarks relating to IBM and Folder 1A may hold bookmarks relating to Linux at IBM. Folder 2 may hold bookmarks relating to Linux. Thus, the user may wish to create a subfolder under Folder 2 that relates to Linux at IBM. This subfolder may be a duplicate of Folder 1A. In accordance with a preferred embodiment of the present invention, a user may create a symbolic link (symlink) to keep the folder "Folder 1A" and to link to it via a symlink under Folder 2. This is shown in FIG. 4 as "Link to Folder 1A." Thereafter, when the user adds a bookmark to Folder 1A, the bookmark will also be added under "Link to Folder 1A."

Figure 5:
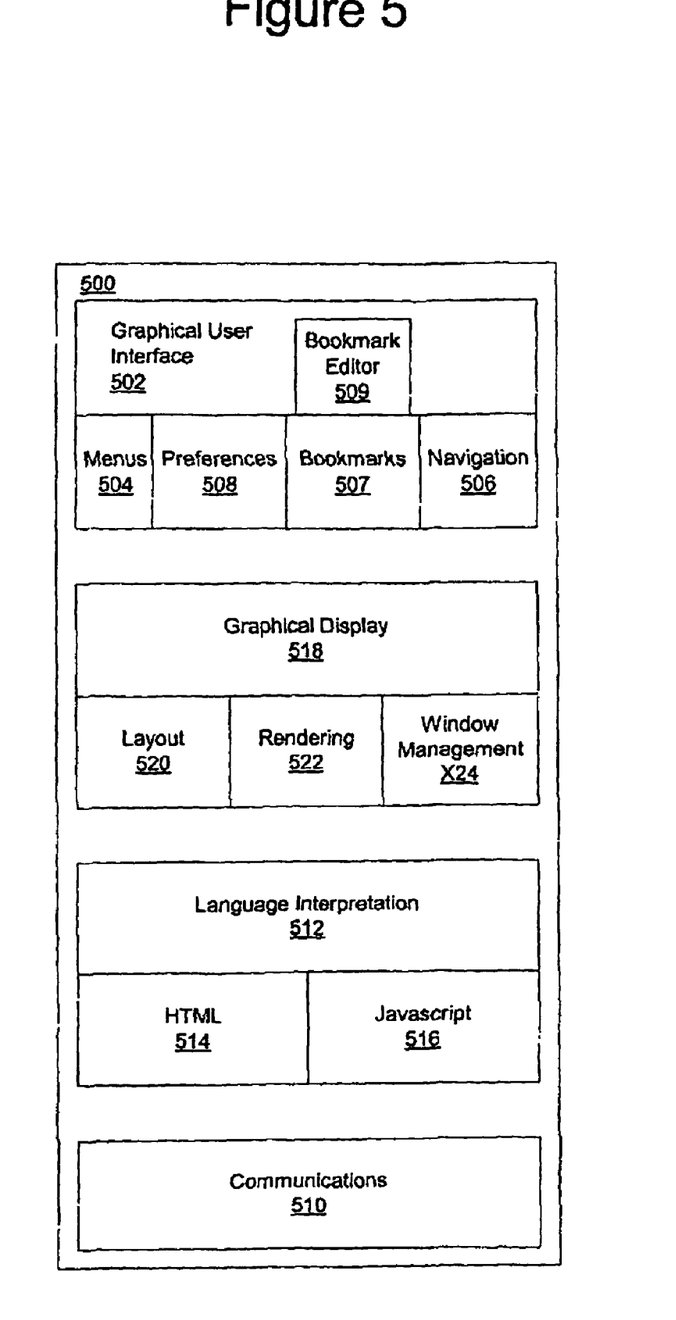
FIG. 5 is a block diagram of a browser program in accordance with a preferred embodiment of the present invention.

Turning next to FIG. 5, a block diagram of a browser program is depicted in accordance with a preferred embodiment of the present invention. A browser is an application used to navigate or view information or data in a distributed database, such as the Internet or the World Wide Web.

In this example, browser 500 includes a user interface 502, which is a graphical user interface (GUI) that allows the user to interface or communicate with browser 500. This interface provides for selection of various functions through menus 504 and allows for navigation through navigation 506. For example, menu 504 may allow a user to perform various functions, such as saving a file, opening a new window, displaying a history, and entering a URL. Navigation 506 allows for a user to navigate various pages and to select web sites for viewing. For example, navigation 506 may allow a user to see a previous page or a subsequent page relative to the present page. Preferences such as those illustrated in FIG. 5 may be set through preferences 508.

Communications 510 is the mechanism with which browser 500 receives documents and other resources from a network such as the Internet. Further, communications 510 is used to send or upload documents and resources onto a network. In the depicted example, communication 510 uses HTTP. Other protocols may be used depending on the implementation. Documents that are received by browser 500 are processed by language interpretation 512, which includes an HTML unit 514 and a JavaScript unit 516. Language interpretation 512 will process a document for presentation on graphical display 518. In particular, HTML statements are processed by HTML unit 514 for presentation while JavaScript statements are processed by JavaScript unit 516.

Graphical display 518 includes layout unit 520, rendering unit 522, and window management 524. These units are involved in presenting web pages to a user based on results from language interpretation 512.

Browser 500 is presented as an example of a browser program in which the present invention may be embodied. Browser 500 is not meant to imply architectural limitations to the present invention. Presently available browsers may include additional functions not shown or may omit functions shown in browser 500. A browser may be any application that is used to search for and display content on a distributed data processing system. Browser 500 make be implemented using know browser applications, such Netscape Navigator or Microsoft Internet Explorer. Netscape Navigator is available from Netscape Communications Corporation while Microsoft Internet Explorer is available from Microsoft Corporation.

In accordance with a preferred embodiment of the present invention, GUI 502 includes bookmark editor 509 that allows the user to edit bookmarks 507. The bookmark editor allows the user to symbolically link a bookmark or folder to a reference bookmark or folder in bookmarks 507. The symlink may be a pointer to the reference bookmark or folder.

Figure 6:
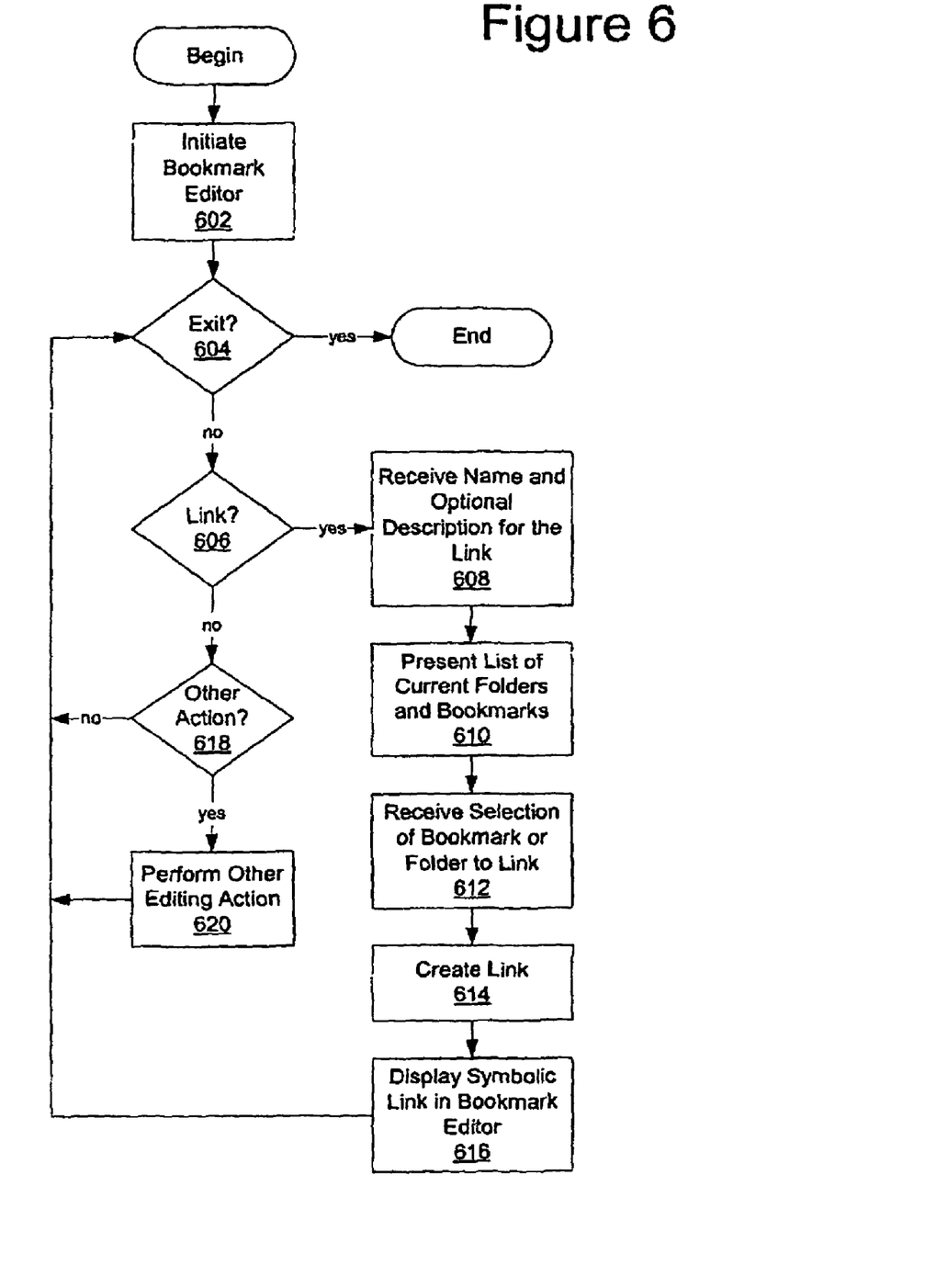
FIG. 6 is a flowchart illustrating the operation of a bookmark editor in accordance with a preferred embodiment of the present invention.

With reference now to FIG. 6, a flowchart is shown illustrating the operation of a bookmark editor in accordance with a preferred embodiment of the present invention. The process begins and initiates the bookmark editor (step 602). A determination is made as to whether an exit condition exists (step 604). An exit condition may exist when the user closes the window or when any other event occurs that causes the bookmark editor dialog to close. If an exit condition exists, the process ends.

If an exit condition does not exist in step 604, a determination is made as to whether to create a link or symlink (step 606). The process may determine to create a link if the user enters a command to create a link. Alternatively, the process may receive a command to create a bookmark for a document and make a determination as to whether a bookmark already exists for the document. Each bookmark may store a uniform resource locator (URL) for the referenced document. When the process receives a command to create a bookmark for a document, the process may compare the URL of the document with the URLs of each existing bookmark. If a bookmark exists for the URL, the process may prompt the user as to whether to create a link rather than a new bookmark.

If a link is to be created, the process receives a name and an optional description for the link (step 608), presents a list of current folders and bookmarks (step 610), receives a selection of a bookmark or folder to link (step 612), creates the link (step 614), and displays the symbolic link in the bookmark editor (step 616). Next, the process returns to step 604 to determine whether an exit condition exists.

If the user does not enter a command to create a link in step 606, a determination is made as to whether the user enters a command to perform another action (step 618). If the user enters a command to perform another action, the process performs the other editing action (step 620) and returns to step 604 to determine whether an exit condition exists. If the user does not enter a command to perform another editing action in step 618, the process returns to step 604 to determine whether an exit condition exists.

Thus, the present invention solves the disadvantages of the prior art by providing a bookmark editor in an Internet web browser application that allows a user to create symbolic links between bookmarks and bookmark folders. The user may then keep a folder, subfolder, or bookmark and link to it via a symbolic link. When a bookmark is added to a folder or subfolder, the user does not need to duplicate that bookmark for a linked folder or subfolder. The present invention may also detect when a bookmark already exists for a document and prompt the user to create a link rather than a new bookmark for the same document. When a bookmark is modified, such as updating a uniform resource locator (URL), any symbolic link to that bookmark also reflects that modification.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for creating symbolic links to bookmarks, comprising:
   a memory having computer usable program code for creating the symbolic links to the bookmarks encoded thereon;
   a bus connecting the memory to a processor; and
   a processor, wherein the processor executes the computer usable program code to implement at least one existing bookmark; and to implement a bookmark editor that receives a request to create a new bookmark for a document, determines whether a reference bookmark already exists for the document within the at least one existing bookmark in response to receiving the request, creates a symbolic link if the reference bookmark for the document already exists, and links the symbolic link to the already existing reference bookmark, wherein a new bookmark is not created.

2. The apparatus of claim 1, wherein the bookmark editor links the symbolic link to the already existing reference bookmark by storing a pointer to the already existing reference bookmark in the symbolic link.

3. The apparatus of claim 1, wherein each bookmark includes a uniform resource locator for the document.

4. The apparatus of claim 3, wherein the bookmark editor determines whether a reference bookmark already exists for the document by comparing the uniform resource locator of the bookmark to the uniform resource locator of each existing bookmark.

5. The apparatus of claim 1, wherein the bookmark editor prompts a user whether to create the symbolic link if the reference bookmark for the document already exists.

6. The apparatus of claim 5, wherein the bookmark editor creates the symbolic link in response to a user's request to create the symbolic link.

7. An apparatus for creating a plurality of symbolic links to bookmarks from a single reference bookmark, comprising:
   a memory having computer usable program code for creating the plurality of symbolic links to the bookmarks from the single reference bookmark encoded thereon;
   a bus connecting the memory to a processor; and
   a processor, wherein the processor executes the computer usable program code to implement at least one existing bookmark; and to implement a bookmark editor that receives a request to create a symbolic link to an already existing reference bookmark, identifies the already existing reference bookmark within the at least one existing bookmark in response to receiving the request, creates the symbolic link to the already existing bookmark, and links the symbolic link to the already existing reference bookmark.

8. The apparatus of claim 7, wherein the bookmark editor identifies the already existing reference bookmark by presenting the at least one existing bookmark and receiving a selection of the reference bookmark from the at least one existing bookmark.

9. The apparatus of claim 8, wherein the bookmark editor presents the at least one existing bookmark in a tree structure.

10. The apparatus of claim 9, wherein the bookmark editor receives the selection of the reference bookmark in the tree structure.

11. The apparatus of claim 9, wherein the bookmark editor displays a symbolic representation of the symbolic link in the tree structure.

12. An apparatus for creating a plurality of symbolic links to bookmark folders from a single reference bookmark folder, comprising:
   a memory having computer usable program code for creating the plurality of symbolic links to the bookmark folders from the single reference bookmark folder encoded thereon;
   a bus connecting the memory to a processor; and
   a processor, wherein the processor executes the computer usable program code to implement at least one existing bookmark folder; and to implement a bookmark editor that receives a request to create a symbolic folder link to an already existing reference bookmark folder, identifies the already existing reference bookmark folder within the at least one existing bookmark folder in response to receiving the request, creates the symbolic folder link to the already existing bookmark folder, and links the symbolic folder link to the already existing reference bookmark folder.

13. The apparatus of claim 12, wherein the bookmark editor identifies the already existing reference bookmark folder by presenting the at least one existing bookmark folder and receiving a selection of the reference bookmark folder from the at least one existing bookmark folder.

14. The apparatus of claim 13, wherein the bookmark editor presents the at least one existing bookmark folder in a tree structure.

15. The apparatus of claim 14, wherein the bookmark editor receives the selection of the reference bookmark folder in the tree structure.

16. The apparatus of claim 14, wherein the bookmark editor displays a symbolic representation of the symbolic folder link in the tree structure.

17. The apparatus of claim 16, wherein bookmarks added to the reference bookmark folder are displayed in relation to the symbolic representation of the symbolic folder link in the tree structure.

18. A non-transitory computer recordable-type medium having a computer readable program code encoded thereon for creating symbolic links to bookmarks, the computer program product comprising:
   instructions for receiving a request to create a new bookmark for a document;
   in response to receiving the request, instructions for determining whether a reference bookmark already exists for the document;
   instructions for creating a symbolic link if the reference bookmark for the document already exists; and
   instructions for linking the symbolic link to the already existing reference bookmark, wherein a new bookmark is not created.

19. A non-transitory computer recordable-type medium having a computer readable program code encoded thereon for creating symbolic links to bookmarks, the computer program product comprising:
   instructions for receiving a request to create a symbolic link for a document to an already existing reference bookmark;
   in response to receiving the request, instructions for identifying the already existing reference bookmark;
   instructions for creating the symbolic link to the already existing bookmark; and
   instructions for linking the symbolic link to the already existing reference bookmark.

20. A non-transitory computer recordable-type medium having a computer readable program code encoded thereon for creating a plurality of symbolic links to bookmark folders from a single reference bookmark folder, the computer program product comprising:
- instructions for receiving a request to create a symbolic folder link to an already existing reference bookmark folder;
- in response to receiving the request, instructions for identifying the already existing reference bookmark folder;
- instructions for creating the symbolic folder link to the already existing bookmark folder; and
- instructions for linking the symbolic folder link to the already existing reference bookmark folder.

* * * * *